United States Patent [19]

Lane

[11] Patent Number: 4,605,586

[45] Date of Patent: Aug. 12, 1986

[54] FIRE RESISTANT OIL SPILL BARRIER

[75] Inventor: Peter Lane, Orchard Park, N.Y.

[73] Assignee: Globe International Inc., Buffalo, N.Y.

[21] Appl. No.: 750,292

[22] Filed: Jul. 1, 1985

[51] Int. Cl.[4] .................................................. B32B 5/16

[52] U.S. Cl. ........................................ 428/240; 405/63; 428/258; 428/259; 428/260; 428/920

[58] Field of Search ............... 428/257, 260, 266, 267, 428/920, 402, 407, 258, 259, 240, 241, 242; 405/63, 64; 210/693

[56] References Cited

U.S. PATENT DOCUMENTS 4,537,528 8/1985 Simpson ................................ 405/63
4,540,617 9/1985 Kawanishi et al. ................. 428/920

*Primary Examiner*—James J. Bell
*Attorney, Agent, or Firm*—Kane, Dalsimer, Kane, Sullivan and Kurucz

[57] ABSTRACT

A portable, fire-resistant barrier for the containment of marine oil spills comprises a continuous length of interwoven high-temperature resistant yarns and metallic wires, coated with a high-temperature resistant synthetic polymeric resin. The woven fabric barrier is buoyed by fire-resistant buoys and stabilized with ballast.

7 Claims, 5 Drawing Figures

FIRE RESISTANT OIL SPILL BARRIER

BACKGROUND OF THE INVENTION

1. Field of the Invention

The invention relates to floating oil spill barriers and in particular relates to a fire-resistant, buoyant, oil spill barrier for the containment of marine oil spills.

2. Summary of the Invention

The invention comprises a fire-resistant, portable, barrier for the containment of marine oil spills, which comprises;

(A) a continuous length of a fire-resistant fabric comprising interwoven yarns of heat-resistant material, coated with a liquid-impermeable film;

said fabric being impermeable to a hydrocarbon petroleum oil;

(B) a plurality of buoyant bodies attached to said fabric in a quantity and at positions sufficient to buoy the length of fabric on a body of water; and (C) means for stabilizing the length of fabric when buoyed upon said body of water.

The term "high temperature resistant" as used herein means the material, resin or yarn will not significantly degrade after exposure to temperatures of at least 400° F. to 500° F. for extended periods of time.

The term "fire-resistant" as used herein means the barrier will resist failure for a minimum of 12 hours when exposed to open flame fueled by a petroleum oil.

A major advantage of this barrier over other floating barriers is that it is durable, reusable a number times and economic.

DETAILED DESCRIPTION OF THE PREFERRED EMBODIMENTS OF THE INVENTION

Those skilled in the art will gain an appreciation of the invention from the following description of the preferred embodiments, when read in conjunction with a viewing of the accompanying drawings of FIGS. 1–5, inclusive.

Figure 1:
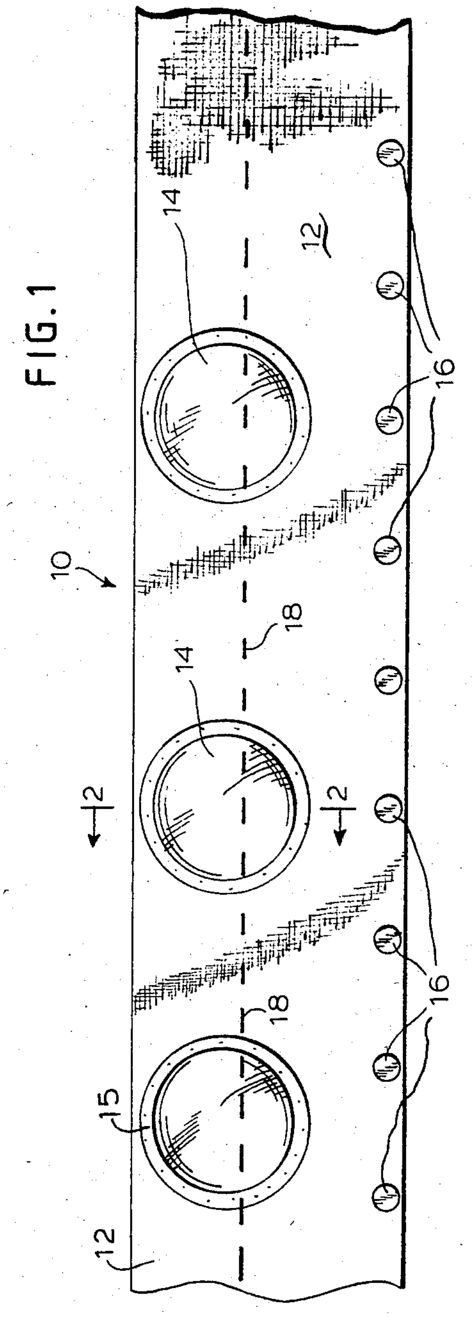
FIG. 1 is a side view of a portion of an embodiment barrier of the invention.

Referring first to FIG. 1, a side view of a portion of a preferred embodiment barrier 10 of the invention is seen. The barrier 10 is an elongate, continuous length of textile fabric 12. When placed in a body of water, the barrier 10 is stabilized to form a barrier both above and below the waterline 18 by ballast weights 16 affixed below the waterline 18 to the fabric 12. Affixation of weights 16 such as lead weights to fabric 12 may be by any convenient method, such as with adhesive, etc. The weights 16 spaced apart at the bottom of fabric 12 function as ballast means to stabilize the barrier 10 vertical or perpendicular to its lengthwise axis in water, pulling against the buoyant force exerted upon the fabric 12 by the buoyant bodies 14. Buoyant bodies 14 are hemispheres spaced apart from each other by the fabric 12 and affixed at spaced intervals along the length of fabric 12 at to the fabric 12 at a point desired for waterline 18.

Figure 2:
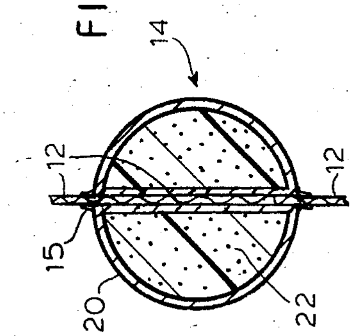
FIG. 2 is a view along lines 2—2 of FIG. 1.

FIG. 2 is a view along lines 2—2 of FIG. 1 and shows a cross-sectional view of two of the buoyant bodies 14 mounted on and separated by the fabric 12. The preferred buoyant body 14 is fabricated from a fire-resistant material such as a hollow, closed steel hemisphere 20 filled with a buoyant material 22 in sufficient volume to buoy both the shell of hemisphere 20 and the supported fabric 12. Preferred as a buoyancy filler material 22 is a high-temperature resistant material such as a foamed glass having a specific gravity less than the specific gravity of water. Any high-temperature resistant material 22 may be used and the material 22 is not limited to foamed glass but may include syntactic foams of synthetic polymeric resins which are also high-temperature resistant.

A wide range of synthetic, polymeric resins may be used to prepare the resin component of the syntactic foams employed in the fabrication of the hemispheres 14. Representative of such resins are polyurethanes, polyesters, polyepoxides and like resins. Co-polymer resins such as styreneacrylonitrile and the like may also be used. The polyester resins such as those described in the U.S. Pat. No. 4,104,357 are advantageous.

Syntactic foams are hardened, synthetic polymeric resins loaded or filled with a plurality of microspheres. Methods of manufacturing syntactic foams are well known; see for example U.S. Pat. Nos. 3,353,981; 3,230,184; and 3,622,437. In general, syntactic foams are hardened or cured synthetic, polymeric resins filled or loaded with hollow, closed microspheres, as defined by the ASTM Committee on Syntactic Foam. The microspheres act as fillers, but advantageously also reduce the overall density of the foam. The microsphere filler materials are also well known and may be fabricated from glass, ceramic, polymeric resins and like materials; see U.S. Pat. Nos. 2,797,201 and 3,133,821. Preferred microsphere components of the syntactic foam matrices employed in the present invention are represented by the commercially available "Glass Bubbles" (3M Corporation, St. Paul, Minn.). Generally such microspheres have diameters of 5 to 500 microns.

The proportion of microspheres or other fillers may constitute from 50 to 75 percent by volume of the resin from composition, i.e. the syntactic foam.

The buoying bodies may be affixed to the fabric 12 in any convenient way, and in sufficient frequency to buoy the length of fabric 12 in a body of water. One convenient method of attachment is through the means of a flange 15 or yoke attached to the fabric and secured to the equator of the body 14, as shown in FIG. 2.

The barrier 10 of the invention is flexible and may be folded in any lateral direction. This flexibility allows use of the barrier 10 of the invention to circumscribe and contain an oil spill of any configuration upon the surface of a body of water. Also, the flexibility enables one to draw the barrier 10 onto a reel for fast and easy deployment when needed.

Figure 3:
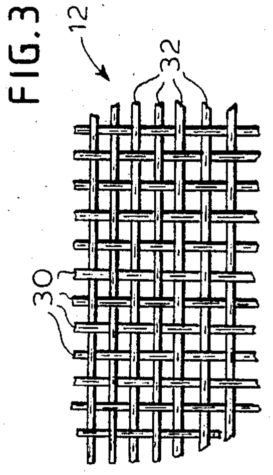
FIG. 3 is an enlarged view of a portion of the fabric component of the barrier shown in FIG. 1.

Flexibility of the barrier 10 is an inherent property of the fabric 12, made up of interwoven yarns of heatresistant materials. FIG. 3 is an enlarged view of a portion of the fabric 12 and shows interwoven warp yarns 30 and weft yarns 32. The yarns 30, 32 are woven together in a weave density which would inhibit the permeability of the fabric 12 to a hydrocarbon petroleum oil. Coupled with the coating described herewith, the barrier 10 is impermeable to the passage of oil, freely floating on a body of water.

The yarns 30, 32 may be any known high-temperature resistant yarns. Representative of such yarns are multifilament yarns of glass, carbon, aramid, polybenzimidazole, polyoxyadiazole fibers, mixtures thereof and the like. Spun yarns from staple fibers include fibers of aramid, ceramic, novaloid and blends thereof spun into yarns. Preferred high-temperature resistant yarns for use in the barrier of the invention are composite yarns such as is described in the U.S. Pat. No. 4,159,618. Other preferred yarns are yarns prepared from fibers of the polyamide polymer of m-phenylenediamine and isophtaloyl chloride (commercially available under the trade name "Nomex" from E.I. DuPont de Nemours and Co.) or from fibers of poly(p-phenylene terephthalamide) which are also commercially available under the trademark "Kevlar" from E.I. DuPont de Nemours and Co. The preference is based upon the high-temperature resistance of these fibers.

The yarns 30, 32 may also be represented by high temperature-resistant yarns such as, for example, composite yarns of a high-tensile strength core covered with a braid of high temperature resistant, synthetic polymeric resin filaments. Preferably, the composite yarns are prepared by braiding a polyamide fiber multifilament yarn, such as one within the scope of those described above over a core material. The core materials used in the yarns may be fiberglass, E glass and like fibers; metal wires such as Chromel R, Rene 41, Halstelloy B, phosphor bronze and the like; and combinations of the above. Preferred as the core material is a bundle of fiberglass (multifilament glass yarns) with a single strand of phosphorous bronze wire. The fabrication of such composite yarns is well known in the art and need not be discussed here. Other yarns meeting the above requirements are well known to those skilled in the art.

Also advantageously employed as the yarns 30, 32 are yarns of weavable metal and inorganic refractory fibers such as yarns of Fiberfrax, available from Sohio Resistant Materials, Co., Niagara Falls, N.Y. Particularly preferred fabrics 12 for use in the barrier 10 of the invention have warp yarns of Iconel wire and filling yarns of a blend of Iconel and Fiberfrax.

The yarns 30, 32 making up the fabric 12 may be of a wide variety of denier, i.e., advantageously from about 200 to about 2,000 denier. The fabric 12 may be woven in any conventional weave pattern, preferably a plain or basket weave. Weaving of the yarns 30, 32 constituting the fabric 12 is advantageously carried out so as to provide fabrics with a weight of from about 45 to about 60 ozs. per square yard.

Figure 4:
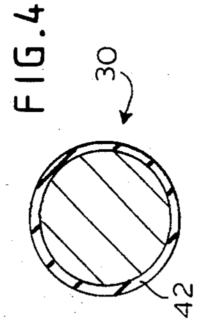
FIG. 4 is an enlarged cross-sectional view of a component yarn 30 shown in FIG. 3.
Figure 5:
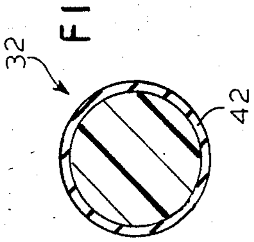
FIG. 5 is an enlarged cross-sectional view of a component yarn 32 shown in FIG. 3.

The fabric 12 is coated to protect the yarns 30, 32 and to render the fabric impermeable to hydrocarbon petroleum oils. The coating, of a synthetic polymeric resin, may be continuous or discontinuous, so long as it acts in conjunction with the weave of the fabric to obtain the desired oil impermeability. The coating need only cover, at least partially, the interwoven yarns 30, 32 and can therefore be discontinuous over the whole of the fabric 12. As shown in FIG. 4, an enlarged cross-sectional view of a yarn 30 as described above is coated with a synthetic polymeric resin 42. Likewise, as shown in FIG. 5, an enlarged cross-sectional view of a yarn 32, a resin coating 42 is coated thereon. Any known high temperature resistant, synthetic, barrier polymeric resin coating may be employed in the invention. Representative of such resins are polysulfones, organopolysilicones, polyphenylene sulfide, polyepoxides, polyesters, polyester-imide, polyamide-imide, polyimides, polyquinozalines, mixtures thereof and like high temperature resistant resin.

The invention is not limited to the use of a single resin, but includes also a combination of resins as separate coating layers or as mixtures.

The amount of resin applied is generally not critical, however, the fabrics 12 advantageously are coated with resin such that the finished fabric weight of which from 2.5 to 15 percent comprises resin weight. The preferred fabrics have weights of which from 2.5 percent to 5 percent comprises resin weight.

The resin coating may be applied to the fabric 12 by any conventional method, such as by curtain spray, dipping or doping.

The following example describes the manner and process of making and using the invention and sets forth the best mode contemplated by the inventor for carrying out the invention but are not to be considered as limiting the scope of the invention.

EXAMPLE

A woven fabric is provided, characterized by its fire resistance light weight and durability. The fabric has a warp of 100% Iconel Wire and a filling of a blend of Iconel and Fiberfrax. The wire serves to provide support to the fabric structure while exposed to fire, and also has very good tensile strength properties, even at elevated temperatures. The "wire screen effect" of the interwoven wires helps to maintain integrity even after prolonged fire exposure. The Fiberfrax filling material is a stuffer yarn to help the wire screen remain impermeable after exposure to burning. It also provides a base for a polymeric resin coating to adhere to.

The fabric is coated in a conventional manner with a high-temperature resistant polyimide resin (2.5 to 4.0% weight add on). The barrier is prepared by mechanically attaching a 12" wide strip of the fabric to a non-fireproof fabric, which serves to provide a below the waterline barrier. Identical hemispherical floats are mechanically attached to the fabric through holes provided on the flange of the float shells. The barrier is also provided with ballast and quick acting end connectors so that it can be used much like any conventional oil spill barrier.

The barrier fabricated in accordance with this example, when floated on a water surface has a draft of 20 inches, a freeboard of 10 inches, an overall height of 30 inches and a weight of 8 to 10 lbs./linear feet. The coated barrier fabric has a tensile strength of 1000 lbs./inch and a tear strength of 500 lbs./in. The barrier, deployed to contain a petroleum oil spill on fire, will do so for a minimum of 12 hours before failure (exposure to temperatures of up to 2400° F.).

The barrier may be deployed generally downwind of an oil spill, according to generally accepted practices. An advantage of this barrier, is that it may be used to completely isolate an oil spill that is going to be burned for disposal, rather than recovery. While burning, the barrier is used to control the burning oil and reduce the available spreading area of the oil while it is burning.

After the fire is out, the barrier can be recovered and repaired so that it can be put back in service. The design of this barrier is such that the above-surface refractory fabric is replaceable by removing the fasteners that connect it to the below-surface portion of the barrier and to the floats.

Many modifications may be made to the above-described preferred embodiment of the invention without departing from the spirit and the scope of the invention. For example, to reduce costs of the barrier of the invention, those portions of the barrier fabric 12 described above which extend below the waterline 18 may be fabricated from less costly yarns which need not be resistant to high temperatures, since such portions, immersed in water, are inherently protected from open flames.

What is claimed:

1. A fire-resistant, portable, barrier for the containment of marine oil spills, which comprises;

(A) a continuous length of a fire-resistant fabric comprising interwoven yarns of heat-resistant material, coated with a liquid-impermeable film;

said fabric being impermeable to a hydrocarbon petroleum oil;

(B) a plurality of buoyant bodies attached to said fabric in a quantity and at positions sufficient to buoy the length of fabric on a body of water; and (C) means for stabilizing the length of fabric when buoyed upon said body of water.

2. The barrier of claim 1 wherein the fabric comprises interwoven yarns of a metal wire and filler yarns of inorganic refractory fibers.

3. The barrier of claim 1 wherein the film is a film of a heat-resistant, synthetic, polymeric resin.

4. The barrier of claim 1 wherein the buoyant bodies are steel hemispheres filled with a high-temperature resistant buoyancy filler material.

5. The barrier of claim 4 wherein the filler material is a foamed glass.

6. The barrier of claim 4 wherein the filler material is a syntactic foam.

7. The barrier of claim 1 wherein said means for stabilization comprises ballast weights attached to the fabric.

* * * * *